United States Patent [19]
Fox et al.

[11] Patent Number: 5,953,522
[45] Date of Patent: Sep. 14, 1999

[54] TEMPORARY COMPUTER FILE SYSTEM IMPLEMENTING USING ANONYMOUS STORAGE ALLOCATED FOR VIRTUAL MEMORY

[75] Inventors: Kevin C. Fox, San Jose; Timothy P. Marsland, Palo Alto; Michael L. Federwisch, San Jose; James J. Voll, Palo Alto; Madhusudhan Talluri, San Jose, all of Calif.

[73] Assignee: Sun Microsystems, Inc., Mountain View, Calif.

[21] Appl. No.: 08/675,360

[22] Filed: Jul. 1, 1996

[51] Int. Cl.$^6$ .................................................. G06F 12/08
[52] U.S. Cl. ................................. 395/681; 707/205; 711/6
[58] Field of Search ............................. 711/6; 395/406, 395/681; 707/205

[56] References Cited

U.S. PATENT DOCUMENTS

| | | | |
|---|---|---|---|
| 4,649,479 | 3/1987 | Advani et al. | 395/681 |
| 5,088,031 | 2/1992 | Takasaki et al. | 711/6 |
| 5,175,855 | 12/1992 | Putnam et al. | 395/681 |
| 5,430,845 | 7/1995 | Rimmer et al. | 395/681 |
| 5,463,772 | 10/1995 | Thompson et al. | 711/112 |
| 5,502,576 | 3/1996 | Ramsay et al. | 358/444 |
| 5,721,916 | 2/1998 | Pardikar | 395/617 |

OTHER PUBLICATIONS

Petzold, Charles, "Cleaning Up After IBM", *PC Magazine*, v7, n8, p221(5), Apr. 26, 1988.

Nesbitt, Kenn, "Stretching Your Memory", *Data Based Advisor*, v10, n2, p150(1), Feb. 1992.

Finnegan, "Windows", *PC Magazine*, v10, n14, p441(3), Aug. 1991.

*Primary Examiner*—Eddie P. Chan
*Assistant Examiner*—Gary J. Portka
*Attorney, Agent, or Firm*—Beyer & Weaver, LLP

[57] ABSTRACT

A devtmp device driver provides the functionality of temporary files by representing a virtual device and including the virtual device among several devices within which a file system can store files. Rather than storing data in and retrieving data from a physical device, the devtmp device driver stores data in and retrieves data from anonymous storage through a swap file system which manages anonymous storage for a virtual memory system. A file system uses the devtmp device driver in the same manner the file system uses conventional device drivers which store data in and retrieve data from secondary storage devices. Since the devtmp device driver represents a virtual device whose data are stored in anonymous storage managed by the swap file system, the total amount of storage available for storing data of temporary files is shared among the various components of a computer process to successfully satisfy various needs of various computer processes. Temporary files can be accessed through a main file system, e.g., the UNIX file system, using a delayed-write-mode. In the delayed-write mode, the file system does not write metadata of a device to secondary storage and writes substantive data of files stored on the device only when insufficient primary storage is available to store the substantive data. Accordingly, temporary files are stored in primary storage so long as primary storage is available for such temporary files and are stored in, or moved to, secondary storage when primary storage is unavailable.

40 Claims, 6 Drawing Sheets

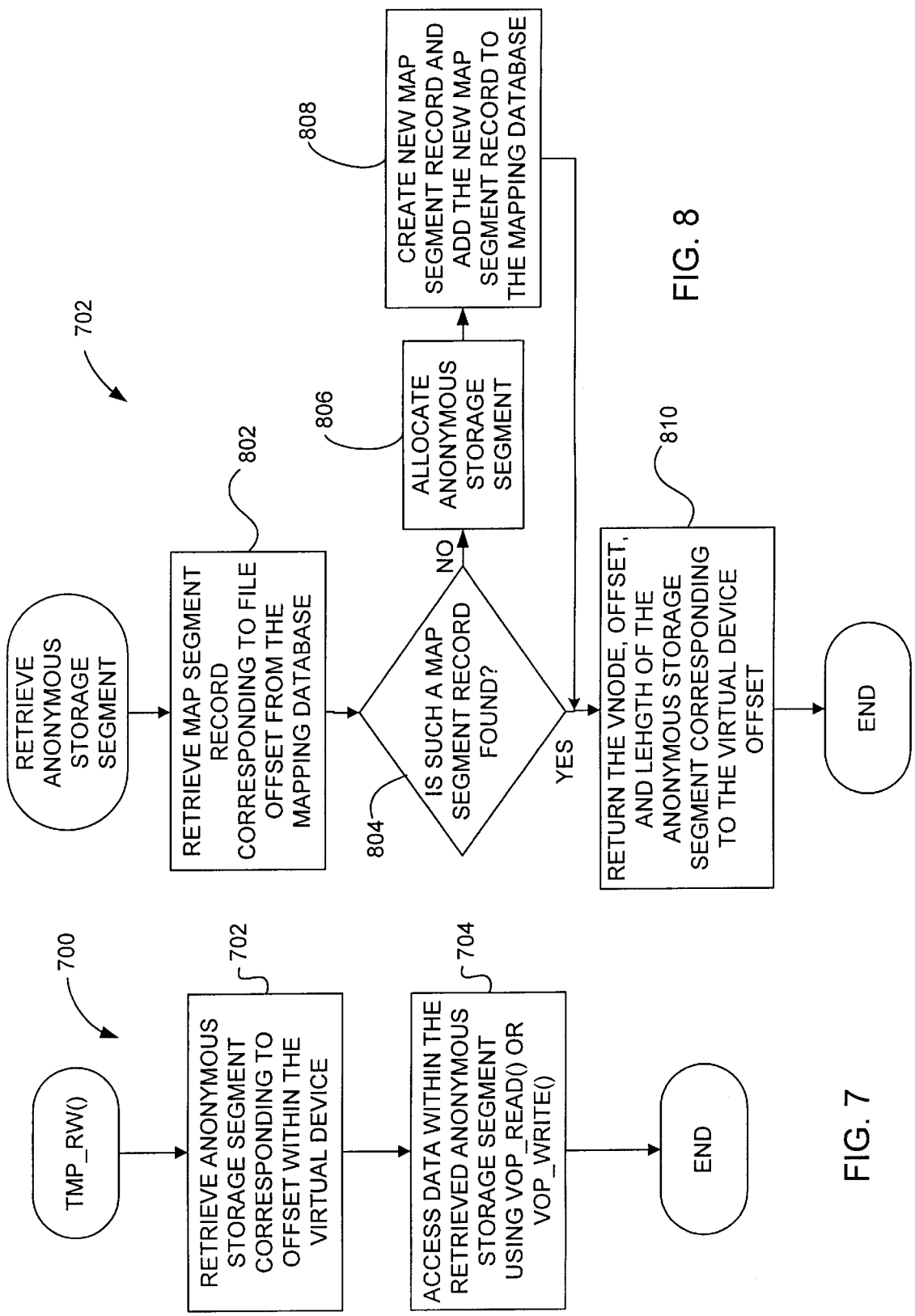

TEMPORARY COMPUTER FILE SYSTEM IMPLEMENTING USING ANONYMOUS STORAGE ALLOCATED FOR VIRTUAL MEMORY

FIELD OF THE INVENTION

The present invention relates to computer file systems and, in particular, to a particularly efficient and easily implemented temporary file system for a computer.

BACKGROUND OF THE INVENTION

It is frequently desirable in computer processing to store intermediate results of such processing in temporary files. A temporary file is generally a file which is designed to be destroyed upon shut-down of the computer system within which the file is stored and which can therefore be stored in volatile storage. A computer process can create such temporary files for workspace for storage of intermediate results or to take advantage of the quickness with which such temporary files are accessed.

Temporary files are generally accessed particularly efficiently since temporary files are frequently stored in primary storage rather than secondary storage. Primary storage typically includes computer memory such as randomly accessible memory (RAM and is currently most commonly found in the form of semiconductor memory devices. Secondary storage typically involves magnetic and optical storage media such as magnetic and optical disks. Access to secondary storage typically requires many times as much time as access to primary storage. Permanent files, i.e., files which generally persist past the shut-down of a computer within which the files are stored, are typically stored in secondary storage. Therefore, access to temporary files can be many times more efficient than access to permanent files.

Temporary files are typically implemented by a file system which is called, in some computer systems, the temporary file system or "tmpfs." The temporary file system is implemented separately from the UNIX file system, i.e., "ufs" in some computer systems, and other file systems of a computer system which generally implement files other than temporary files. It is generally preferable that all file systems have analogous interfaces and generally similar behaviors such that a computer process requires only minor modification to create and manipulate files implemented by one or another of the various file systems. To provide an analogous interface and generally similar behavior to the comprehensive UNIX file system, the temporary file system is itself rather comprehensive and complex. The complexity of the temporary file system makes maintenance of the temporary file system a sizeable task.

In addition, changes to and extensions of the UNIX file system must also be implemented in the temporary file system. Thus, two solutions must generally be found for each problem: one for the UNIX file system and one for the temporary file system. For example, the UNIX file system in some operating systems limits the amount of data which can be stored in a single file to a maximum, e.g., 2 gigabytes. If the UNIX file system is modified to permit larger amounts of data in a single file, the temporary file system must also be modified to permit such larger amount of data to be stored in a single temporary file. The implementation of such a modification can be entirely different between the various file systems, requiring entirely different, multiple implementations of the modification.

What persists as an unsolved need in the industry is a temporary file system which obviates much of the duplicate maintenance required by conventional temporary file systems.

SUMMARY OF THE INVENTION

In accordance with the present invention, a devtmp device driver provides the functionality of temporary files by representing a virtual device and including the virtual device among several devices within which a file system can store files. Rather than storing data in and retrieving data from a physical device, the devtmp device driver stores data in and retrieves data from anonymous storage through a swap file system which manages anonymous storage for a virtual memory system. A file system uses the devtmp device driver in the same manner the file system uses conventional device drivers which store data in and retrieve data from secondary storage devices. Since the devtmp device driver represents a virtual device whose data are stored in anonymous storage managed by the swap file system, the total amount of storage available for storing data of temporary files is shared among the various components of a computer process to successfully satisfy various needs of various computer processes. For example, sharing swap file storage capacity among the components of a computer process allows a computer process which uses little virtual memory to use additional swap file storage capacity for temporary files and allows a computer process which uses little swap file storage capacity for temporary files to use additional swap file storage capacity for virtual memory access.

Further in accordance with the present invention, temporary files are accessed through a main file system, e.g., the UNIX file system, using a delayed-write mode. In the delayed-write mode, the file system does not write metadata of a device to secondary storage and writes substantive data of files stored on the device only when insufficient primary storage is available to store the substantive data. Accordingly, temporary files are stored in primary storage so long as primary storage is available for such temporary files and are stored in, or moved to, secondary storage when primary storage is unavailable. Since the main file system stores the substantive data on the virtual device managed by the devtmp device driver, the substantive data are stored in anonymous storage through the swap file system.

Thus, in accordance with the present invention, temporary files are not implemented by a separate file system which simulates another file system, e.g., the UNIX file system, but instead by a separate device driver, i.e., the devtmp device driver, which is used by other file systems to implement temporary files. Accordingly, no substantial modification to other file systems is required to implement temporary files. In addition, any modification to a file system, e.g., the UNIX file system, is automatically implemented for temporary files as well since UNIX file system processes both permanent and temporary files. For example, if the UNIX file system is modified to allow greater amounts of data to be stored in a single file, the modification is automatically implemented for temporary files since temporary files are accessed through the UNIX file system. Furthermore, device drivers are generally considerably less complex than a file system such as the UNIX file system. Accordingly, implementation of the devtmp device driver is significantly less complicated and less arduous than implementation of a separate temporary file system which simulates the UNIX file system and yet retains the functionality and performance of conventional implementations of temporary files. Thus, the present invention represents a significant improvement over the prior art.

BRIEF DESCRIPTION OF THE DRAWINGS

FIG. 7 is a logic flow diagram of a read and write procedure implemented by the devtmp device driver of FIG. 3.

FIG. 8 is a logic flow diagram of a step of the logic flow diagram of FIG. 7.

DETAILED DESCRIPTION

Figure 1:
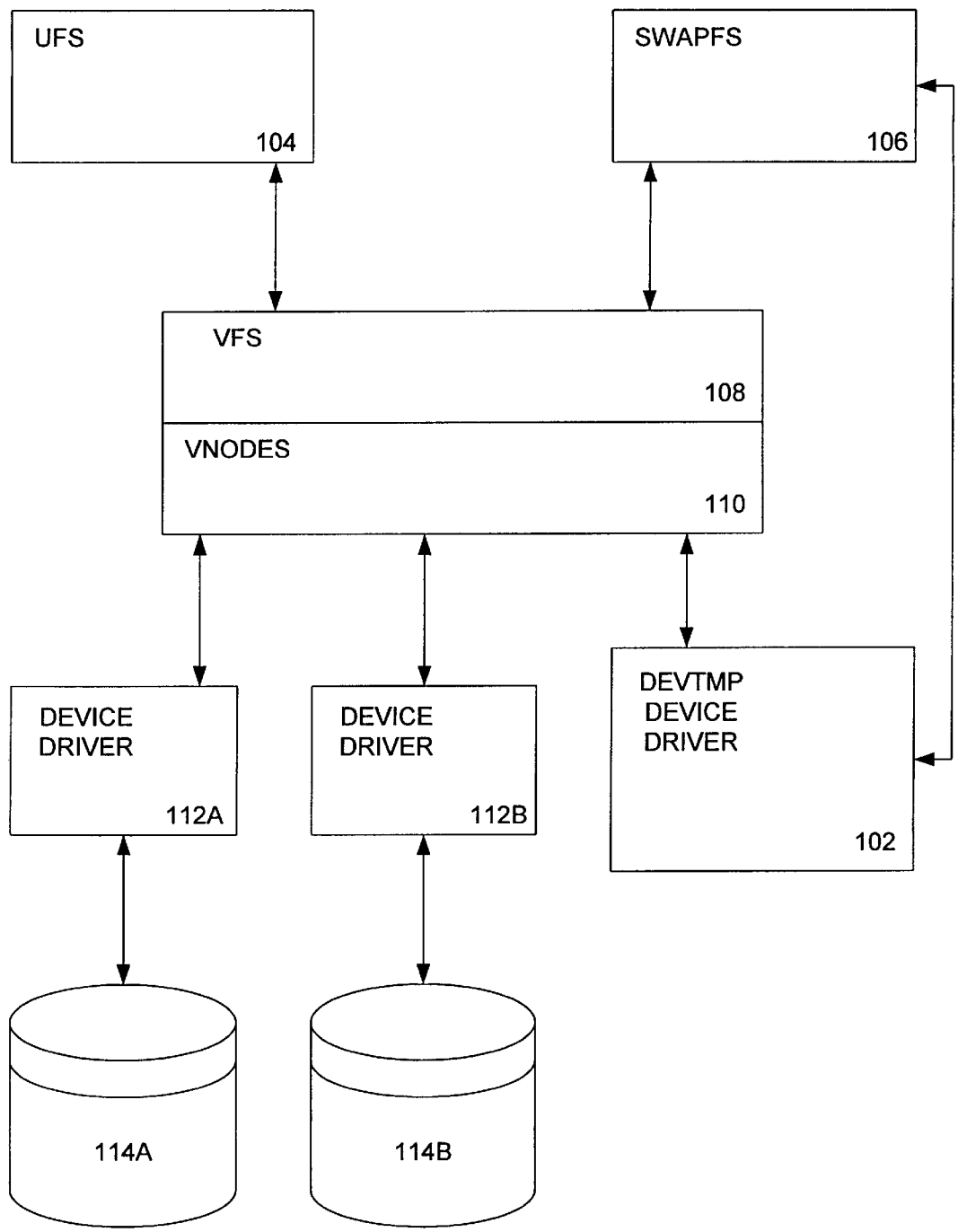
FIG. 1 is a block diagram illustrating inter-relationships between various file systems and device drivers, including a devtmp device driver in accordance with the present invention.

In accordance with the present invention, a devtmp device driver 102 (FIG. 1) provides the functionality of temporary files by representing a virtual device and including the virtual device among several devices within which UNIX file system 104 can store blocks of data which are organized by UNIX file system 104 into files. Rather than storing data in and retrieving data from a physical device, devtmp device driver 102 stores data in and retrieves data from anonymous storage through a swap file system 106 which manages anonymous storage for a virtual memory system. Anonymous storage and virtual memory systems are known, but are described briefly below for completeness. UNIX file system 104 uses devtmp device driver 102 in a manner which is directly analogous to the manner in which UNIX file system 104 uses device drivers 112A and 112B to store data in and retrieve data from secondary storage devices 114A and 114B, respectively. Since devtmp device driver 102 represents a virtual device whose data are stored in anonymous storage managed by swap file system 106, the total amount of storage available for storing data of temporary files is shared among the various components of a computer process to successfully satisfy various needs of various computer processes.

Further in accordance with the present invention, temporary files are accessed through UNIX file system 104 using a delayed-write mode. In the delayed-write mode, UNIX file system 104 does not write metadata of a device to secondary storage and writes substantive data of files stored on the device only when insufficient primary storage is available to store the substantive data. Metadata is generally data other than the substantive data stored in files in a device and includes, for example, directory information. Accordingly, temporary files are stored in primary storage so long as primary storage is available for such temporary files and are stored in, or moved to, secondary storage when primary storage is unavailable as described more completely below.

Thus, in accordance with the present invention, temporary files are not implemented by a separate file system which simulates UNIX file system 104 but instead by a separate device driver, i.e., devtmp device driver 102, which is used by UNIX file system 104 to implement temporary files. Accordingly, no substantial modification to UNIX file system 104 is required to implement temporary files. In addition, any modification to UNIX file system 104, e.g., to allow greater amounts of data to be stored in a single file, is automatically implemented for temporary files as well since UNIX file system 104 processes both permanent and temporary files. Furthermore, device drivers such as device drivers 112A–B are generally considerably less complex than a file system such as UNIX file system 104. Accordingly, implementation of devtmp device driver 102 is significantly less complicated and less arduous than implementation of a separate temporary file system which simulates UNIX file system 104. Thus, the present invention represents a significant improvement over the prior art.

Virtual memory systems and anonymous storage are well-known but are described briefly herein for completeness. A virtual memory system allows a computer process to assume the computer process has access to more primary storage than is physically included in the computer system in which the computer process executes. The operating system, e.g., operating system 210 (FIG. 2), represents virtual memory as pages which can be represented in either primary storage or secondary storage. Operating system 210 represents pages in primary storage so long as primary storage is available. When primary storage is unavailable, operating system 210 moves one or more pages which have not been accessed recently to secondary storage which is referred to as anonymous storage. Anonymous storage refers collectively to all secondary storage made available for storing pages of virtual memory and is managed by swap file system 106. In configuring a computer system such as computer system 200, a number of physical storage devices, or partitions of physical storage devices, are designated as anonymous storage. When a page of virtual memory which is represented in anonymous storage is accessed, operating system 210 moves the page back into primary storage, perhaps requiring that another page is moved from primary storage to anonymous storage.

Since temporary files are stored in anonymous storage, the amount of storage available in the virtual device managed by devtmp device driver 102 adjusts automatically according to the use of the computer system within which devtmp device driver 102 is implemented. Consider, for example, allocation of a partition of a secondary storage for temporary files. The allocated partition of secondary storage would then be unavailable as anonymous storage useable by swap file system 106 to store virtual memory pages, and much of the storage capacity of the allocated partition would go wasted if computer processes create and use temporary files only lightly. In addition, the allocated partition could be insufficient to represent temporary files if computer processes are configured to create particularly large and/or numerous temporary files. However, since temporary files are stored in anonymous storage through swap file system 106 in accordance with the present invention, substantially all of the unused anonymous storage of computer system 200 is available for representing temporary files. Conversely, substantially all of the anonymous storage which is not used to represent temporary files is available for other uses of anonymous storage, e.g., storing pages of virtual memory. Accordingly, temporary files are stored in a particularly flexible and versatile manner.

Temporary file system 102 (FIG. 1), UNIX file system 104, swap file system 106, and device drivers 112A–B are all parts of operating system 210 (FIG. 2) of computer system 200. To facilitate appreciation of the present invention, the components of computer system 200 are briefly described. Most computer systems available today are generally of the structure of computer system 200. Computer system 200 includes a processor 202 which fetches computer instructions from a memory 204 through an interconnect 206 and executes those computer instructions. Interconnect 206 can be generally any interconnect mechanism for computer system components and can be, e.g., a bus, a crossbar, a mesh, a torus, or a hypercube. In executing computer instructions fetched from memory 204, processor 202 can retrieve data from or write data to memory 204 and/or secondary storage devices 114A–B, display information on one or more computer display devices 230, or receive command signals from one or more user-input devices 220. Processor 202 can be, for example, any of the SPARC processors available from Sun Microsystems, Inc. of Mountain View, California. Memory 204 can include any type of computer memory including, without limitation, randomly accessible memory (RAM), read-only memory (ROM), and storage devices which include magnetic and optical storage media such as magnetic or optical disks. Computer 200 can be, for example, any of the SPARCstation workstation computer systems available from Sun Microsystems, Inc. of Mountain View, Calif.

Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Computer display devices 230 can include generally any computer display device such as a printer, a cathode ray tube (CRT), light-emitting diode (LED) display, or a liquid crystal display (LCD). User input devices 220 can include generally any user input device such as a keyboard, a keypad, an electronic mouse, a trackball, a digitizing tablet, thumbwheels, a light-sensitive pen, a touch-sensitive pad, or voice-recognition circuitry. User input devices 220 generate input signals in response to physical actions of a user, e.g., pressing a key on a keyboard, moving an electronic mouse, or speaking into a microphone.

Each of devtmp device driver 102 (FIG. 1), UNIX file system 104, swap file system 106, virtual file system (VFS) 108, vnode layer 110, and device drivers 112A–B is a collection of computer instructions and data structures which collectively define a number of procedures which can be invoked to store and manipulate files and/or data. Computer processes executing within computer system 200 (FIG. 2) typically control such storage and manipulation of files through procedures defined in UNIX file system 104 (FIG. 1) and swap file system 106. UNIX file system 104 and swap file system 106 store and manipulate such files through VFS 108, which is well-known and which manages access to such files through vnode layer 110. Vnode layer 110 includes and manages vnodes, which are data structures which in turn represent respective states of respective resources such as secondary storage devices 114A–B. Vnodes are known and conventional. When a vnode of vnode layer 110 represents a device, the vnode includes specification of procedures in a device driver corresponding to the device for performing a number of tasks associated with that device. For example, if a vnode of vnode layer 110 represents secondary storage device 114A, the vnode includes specification of procedures in device driver 112A for accessing blocks of data stored within secondary storage device 114A.

Figure 2:
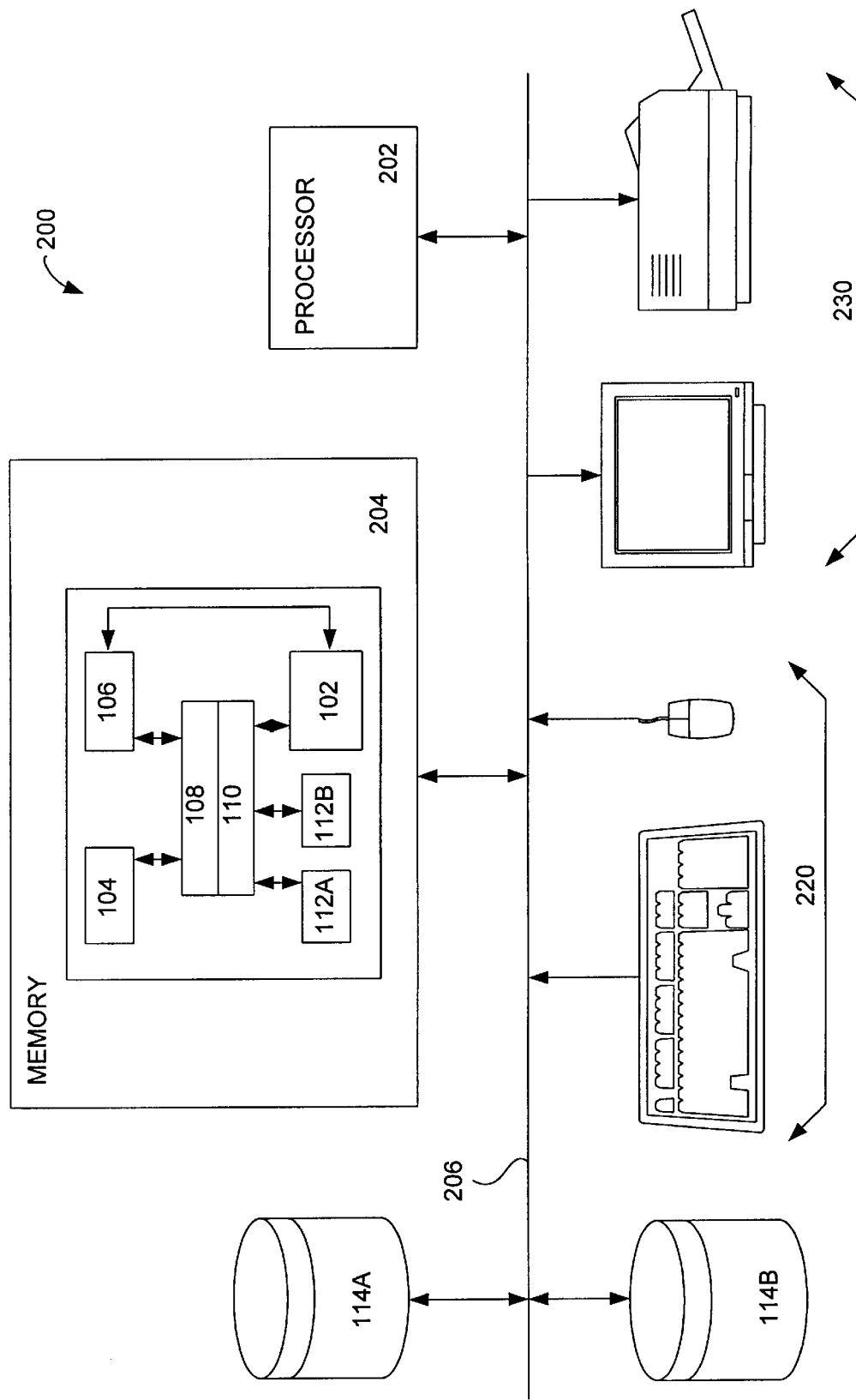
FIG. 2 is a block diagram of a computer system in which the inter-relationships illustrated in FIG. 1 are implemented.

To support access through vnode layer 110, each device driver, including devtmp device driver 102, must implement a standard interface and general behavior. For example, if UNIX file system 104 invokes, through VFS 108 and vnode layer 110, a procedure for accessing a block of data on the device, UNIX file system 104 should use the same interface for making such an invocation and should expect the same general behavior, e.g., that the block of data is accessed, regardless of the particular device driver whose procedure is ultimately executed. Therefore, devtmp device driver 102 implements the standard interface and standard general behavior of device drivers of operating system 210 (FIG. 2). In addition, if a vnode of vnode layer 110 represents the virtual device represented by devtmp device driver 102, the vnode specifies procedures in devtmp device driver 102 for accessing blocks of data stored within the virtual device represented by devtmp device driver 102. Such procedures are included in procedures 304 (FIG. 3) of devtmp device driver 102 and each have a behavior which is defined by a collection of computer instructions and/or data within procedures 304.

Figure 3:
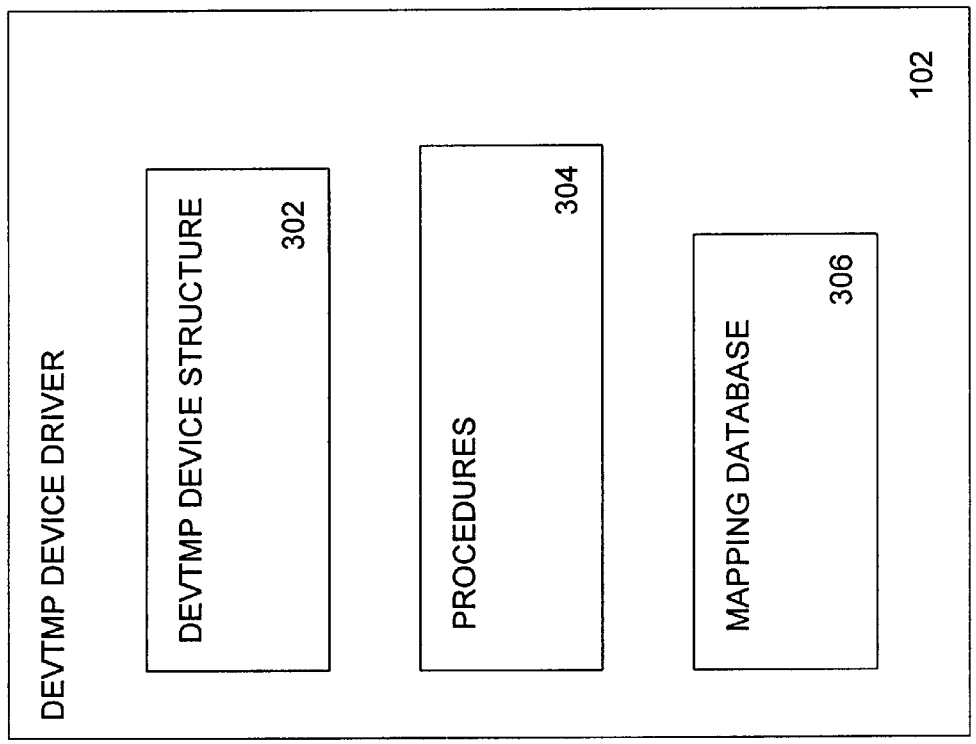
FIG. 3 is a block diagram of the devtmp device driver of FIGS. 1 and 2 in greater detail.

Procedures 304 FIG. 3) of devtmp device driver 102 include tmp_read( ) and tmp_write( ) procedures for retrieving data from and storing data in, respectively, a block within the virtual device managed by devtmp device driver 102. The tmp_read( ) and tmp_write( ) procedures of procedures 304 are performed in response to invocation of the known and conventional read( ) and write( ) procedures defined by UNIX file system 104. As described above, devtmp device driver 102 does not manage data stored in a physical device but instead realizes a virtual device by managing data stored in anonymous storage through invocation of procedures defined within swap file system 106 FIG. 1). Each of the tmp_read( ) and tmp_write( ) procedures cause physical transfer of data into or out of the virtual device managed by devtmp device driver 102 by invocation of the known and conventional physio( ) procedure of operating system 210 (FIG. 2). The physio( ) procedure in turn invokes a strategy( ) procedure specified in the vnode representing the virtual device accessed by the tmp_read( ) and tmp_write( ) procedures. Since the file is stored in blocks of data in the virtual device managed by devtmp device driver 102, the specified strategy( ) procedure is a tmp_strategy( ) procedure, defused by devtmp device driver 102 and included in procedures 304 (FIG. 3) of devtmp device driver 102.

During execution, the tmp_strategy( ) procedure receives from operating system 210 (FIG. 2) a block input/output buffer descriptor, which is generally referred to as a pointer to a buf structure. Block input/output buffer descriptors and buf structures are conventional and well-known. The tmp_strategy( ) procedure verifies that the received buf structure refers to a valid block of the virtual device represented by devtmp device driver 102, i.e., a device identifier in the receive buf structure is valid within devtmp device driver 102. The tmp_strategy( ) procedure further verifies that the amount of data to be accessed according to the received buf structure is no greater than the size of the virtual device as represented by size field 404 (FIG. 4) of devtmp device structure 302 (FIG. 3). If the received buf structure refers to a valid block of the virtual device and the amount of data to access is no greater than the size of the virtual device, the tmp_strategy( ) procedure invokes a tmp_rw( ) procedure of procedures 304 which effects access of the data of the block of the virtual device as illustrated in logic flow diagram 700 (FIG. 7).

Processing according to logic flow diagram 700 begins in step 702 in which devtmp device driver 102 (FIG. 3) determines a particular location within anonymous storage which corresponds to the offset specified by the received buf structure into the block of the virtual device specified in the received buf structure. Step 702 is shown in greater detail as logic flow diagram 702 (FIG. 8) which is described below. Processing transfers to step 704 (FIG. 7) in which devtmp device driver 102 (FIG. 3) invokes the known and conventional VOP_READ( ) procedure of swap file system 106 (FIG. 1) to perform the reading of data from the block offset determined in step 702 (FIG. 7) if the tmp_rw( ) procedure is invoked by execution of the tmp_read( ) procedure of procedures 304 (FIG. 3) or invokes the known and conventional VOP_WRITE( ) procedure of swap file system 106 (FIG. 1) to perform the writing of data to the block offset determined in step 702 (FIG. 7) if the tmp_rw( ) procedure is invoked by execution of the tmp_write( ) procedure of procedures 304 (FIG. 3). In an alternative embodiment, devtmp device driver 102 effects data access by invocation of the known and conventional VOP_PAGEIO( ) procedure of swap file system 106 (FIG. 1). After step 704 (FIG. 7), processing according to logic flow diagram 700, and therefore execution of the tmp_rw( ) procedure, completes. Thus, to effect access to data within a block of the virtual device managed by devtmp device driver 102 (FIG. 3), devtmp device driver 102 translates an offset into the block to a particular location within anonymous storage and effects the data access through invocation of the conventional VOP_READ( ) operation or the conventional VOP_WRITE( ) operation or the conventional VOP_PAGEIO( ) operation of swap file system 106 (FIG. 1). The invocation of the VOP_READ( ), VOP_WRITE( ), and VOP_PAGEIO( ) operations by devtmp device driver 102 is described more completely below.

Logic flow diagram 702 FIG. 8) shows step 702 in greater detail and illustrates the determination of a location within anonymous storage corresponding to a specific offset into a block of the virtual device, which is called herein the "subject block," in step 702 (FIG. 7) as described above. Processing according to logic flow diagram 702 (FIG. 8) begins in step 802. In step 802, devtmp device driver 102 (FIG. 3) attempts to locate within a mapping database, e.g., mapping database 306, a map segment record which corresponds to the offset specified by the buf structure received from operating system 210 FIG. 2) during invocation of the tmp_rw( ) procedure. In the context of logic flow diagram 702 FIG. 8), the buf structure received from operating system 210 (FIG. 2) during invocation of the tmp_rw( ) procedure is sometimes referred to as the subject buf structure.

Figure 5:
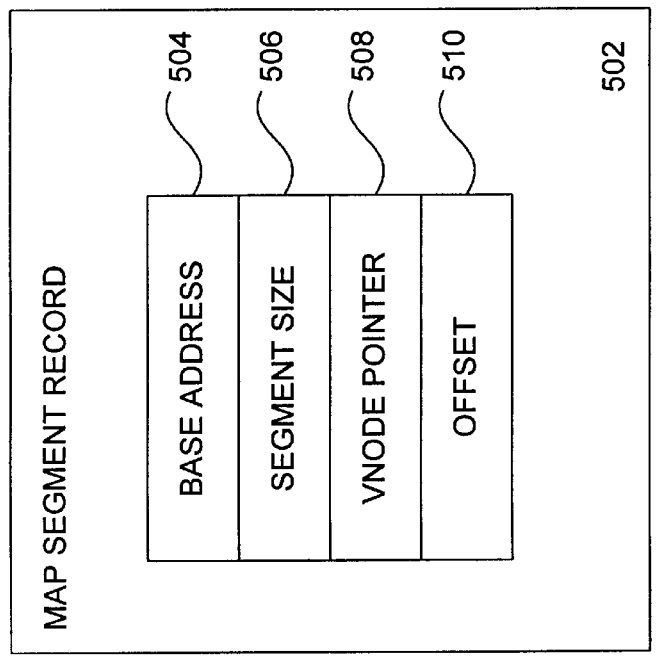
FIG. 5 is a block diagram of a map segment record of a mapping database of the devtmp device driver of FIG. 3.

Mapping database 306 includes a number of map segment records, such as map segment record 502 (FIG. 5). Map segment records of mapping database 306 (FIG. 3) can generally be organized in any manner within mapping database 306 so long as a map segment record corresponding to a particular offset within a block of the virtual device managed by devtmp device driver 102 can be located within mapping database 306. For example, mapping database 306 can organize map segment records as a linked list, a sorted linked list, or a balanced binary tree of map segment records. In a preferred embodiment, mapping database 306 includes a skip list of map segment records in which the number of levels of the skiplist is four (4) and the branch factor of the skiplist is four (4). Skip lists are known and are described, for example, in U. S. Pat. No. 5,446,854 to Madhusudhan Talluri et al. entitled "Virtual Memory Computer System Address Translation Mechanism that Supports Multiple Page Sizes" dated Aug. 29, 1995 which is incorporated herein in its entirety by reference. Searching a skip list for a particular record is generally efficient relative to other comparable database structures, and a skip list is relatively simple to implement.

Map segment record 502 (FIG. 5) includes (i) a base address field 504, (ii) a segment size field 506, (iii) a vnode pointer field 508, and (iv) an offset field 510. Base address field 504 includes data specifying a block or the first of a series of two or more contiguous blocks represented by map segment record 502. In one embodiment, base address field 504 specifies the block in terms of an offset within the virtual device managed by devtmp device driver 102 (FIG. 3). Segment size field 506 includes data specifying the size of the block or the series of blocks represented by map segment record 502. The size of the block or series of blocks can be specified, for example, as a number of bytes or a number of blocks of a fixed size. Together, base address field 504 and segment size field 506 specify the range of addresses in terms of an offset from the beginning of the virtual device as represented by map segment record 502. It is appreciated that a range of addresses can alternatively be specified by data representing minimum and maximum addresses of the address range. Devtmp device driver 102 (FIG. 3) searches mapping database 306 for a map segment record which represents an address range which in turn includes the address specified by the virtual device offset specified in the subject buf structure in step 802 FIG. 8).

Vnode pointer field 508 (FIG. 5) includes a pointer to a vnode in vnode layer 110 (FIG. 1) which represents the state of a segment of anonymous storage which in turn represents a corresponding segment of the virtual device managed by devtmp device driver 102. Offset field 510 (FIG. 5) contains data which specifies an offset into the anonymous storage segment represented by the vnode identified by vnode pointer field 508. Vnode pointer field 508 (FIG. 5) and offset field 510 collectively specify an offset into a segment of anonymous storage which corresponds to the block of the virtual device specified collectively by base address field 504. Thus, map segment record 502 maps blocks of the virtual device managed by devtmp device driver 102, as specified in base address field 504 and segment size field 506, to a particular location within anonymous storage, as specified in vnode pointer field 508 and offset field 510.

After devtmp device driver 102 (FIG. 3) searches mapping database 306 in step 802 (FIG. 8) for a map segment record which corresponds to the offset specified by the subject buf structure, processing by devtmp device driver 102 (FIG. 3) transfers to test step 804 (FIG. 8). In test step 804, devtmp device driver 102 (FIG. 3) determines whether such a map segment record was successfully located in step 802 (FIG. 8). If such a map segment record is located, processing transfers to step 810 which is described more completely below. Conversely, if no such map segment record is located in step 802, processing transfers to step 806.

In step 806, devtmp device driver 102 (FIG. 3) allocates a block of anonymous storage and associates the allocated block of anonymous storage with the subject block. Devtmp device driver 102 allocates the block of anonymous storage by sending to swap file system 106 (FIG. 1) signals requesting such an allocation. In one embodiment, devtmp device driver 102 allocates the block of anonymous storage by invocation of the known, conventional swap_phys_alloc( ) procedure of swap file system 106. In performing the swap_phys_alloc( ) procedure, swap file system 106 returns to devtmp device driver 102 (i) a vnode of vnode layer 110 which represents the state of a segment of anonymous storage and (ii) an offset into the anonymous storage segment of the allocated block.

Devtmp device driver 102 ensures that the allocated block of anonymous storage does not correspond to any block of the virtual device which also corresponds to another block of anonymous storage to thereby ensure the integrity of the virtual device. The integrity of the virtual device is more difficult to ensure if different locations of anonymous storage represent the same location within the virtual device. To ensure that only one location of anonymous storage corresponds to each location within the virtual device, devtmp device driver 102 ((3) allocates a block of anonymous storage whose size is the lesser of (i) the size of the data specified in the subject buf structure or (ii) the difference between (a) the offset into the virtual device specified in the subject buf structure and (b) the next greater offset into the virtual device represented by a map segment record of mapping database 306 (FIG. 3). In one embodiment, devtmp device driver 102 determines the next greater offset into the virtual device represented by a map segment record of mapping database 306 during the search of mapping database 306 in step 802 (FIG. 8) and retains that information for use in calculating the size of the segment of anonymous storage to allocate in step 806.

From step 806, processing transfers to step 808 in which devtmp device driver 102 (FIG. 3) creates a map segment record, e.g., map segment record 502 (FIG. 5), corresponding to the block of anonymous storage allocated in step 806 (FIG. 8) and includes the created map segment record in mapping database 306 FIG. 3). Specifically, devtmp device driver 102 (i) includes in vnode pointer field 508 data identifying the vnode representing the state of the anonymous storage segment as returned by performance of the swap_phys_alloc( ) procedure by swap file system 106 (FIG. 1) and (ii) includes in offset field 510 data representing the offset into the anonymous storage segment of the block of anonymous storage allocated by swap file system 106 (FIG. 1) in step 806 (FIG. 8). Devtmp device driver 102 (FIG. 3) includes in base address field 504 FIG. 5) data representing the offset into the virtual device of the block specified by the subject buf structure. In addition, devtmp device driver 102 includes in size field 506 (FIG. 5) data representing the size of the block of anonymous storage allocated in step 806 FIG. 8) as calculated in the manner described above.

Processing transfers from step 808 to step 810. As described above, processing transfers from test step 804 directly to step 810, bypassing steps 806 and 808, if a map segment record which corresponds to the virtual device block and offset specified by the subject buf structure is located in step 802. In step 810, devtmp device driver 102 (FIG. 3) specifies the vnode, offset, and length of portion of anonymous storage which corresponds to the offset into the subject block specified by the subject buf structure, i.e., to the offset into the subject block at which data is accessed in either the VOP_READ( ) operation or the VOP_WRITE( ) operation as described above. The vnode representing the state of the anonymous storage portion is the vnode identified by vnode pointer field 508 (FIG. 5) of the map segment record retrieved in step 802 (FIG. 8) or created in step 808. In the context of step 810, the map segment record retrieved in step 802 (FIG. 8) or created in step 808 is sometimes referred to as the subject map segment record. The offset of the anonymous storage portion is the offset represented in offset field 510 (FIG. 5) of the subject map segment record plus the difference between the subject block offset specified by the subject buf structure and the base address represented in base address field 504 (FIG. 5) of the subject map segment record. The length of the anonymous storage portion is the lesser of (i) the buffer size specified in the subject buf structure and (ii) the amount of data of the virtual device block or blocks represented by the subject map segment record beyond the subject block offset specified by the subject buf structure.

After step 810, processing according to logic flow diagram 702, and therefore step 702 (FIG. 7), completes. Thus, according to logic flow diagram 702, devtmp device driver 102 (FIG. 3) associates an offset into the virtual device as specified in the subject buf structure with a particular location within of anonymous storage.

As described briefly above, devtmp device driver 102 (FIG. 3) effects transfer of data as specified by the subject buf structure using either the VOP_READ( ) operation or the VOP_WRITE( ) operation in step 704 (FIG. 7). In invoking performance of the VOP_READ( ) or VOP_WRITE( ) operation by swap file system 106 (FIG. 1), devtmp device driver 102 provides to swap file system 106 a vnode which represents the state of a segment of anonymous storage within the data to be accessed is located, i.e., the vnode specified in step 810 (FIG. 8), and a user I/O structure which specifies more specifically the data to be accessed within the segment. Devtmp device driver 102 (FIG. 3) builds the user I/O structure and a iovec structure which collectively specify parameters of the data transfer represented by the subject buf structure. Devtmp device driver 102 builds a iovec structure which describes the offset and buffer size specified in step 810 (FIG. 8) as a single data buffer and build a user I/O structure which references the built iovec structure and indicates within the user I/O structure that the entire transfer of data is to take place within the single buffer represented by the built iovec structure. User I/O structures, which are generally sometimes referred to as uio structures, and iovec structures are conventional and well-known.

In step 704 (FIG. 7), as described above, devtmp device driver 102 (FIG. 3) effects transfer of data as specified in the buf structure by determining whether the buf structure results from execution of the tmp_read( ) procedure or the tmp_write( ) procedure and invokes the appropriate procedure of swap file system 106 (FIG. 1) using the built user I/O structure and iovec structure. If devtmp device driver 102 (FIG. 3) determines that the buf structure results from execution of the tmp_read( ) procedure, devtmp device driver 102 invokes the conventional VOP_READ( ) procedure implemented by swap file system 106 (FIG. 1). Conversely, if devtmp device driver 102 (FIG. 3) determines that the buf structure results from the tmp_write( ) procedure, devtmp device driver 102 invokes the conventional VOP_WRITE( ) procedure implemented by swap file system 106 (FIG. 1). In an alternative embodiment, devtmp device driver 102 effects data access by invocation of the conventional VOP_PAGEIO( ) procedure implemented by swap file system 106. In invoking any of the VOP_READ( ), VOP_WRITE( ), and VOP_PAGEIO( ) procedures, devtmp device driver 102 supplies to swap file system 106 the built user I/O structure, which references the built iovec structure as described above, to indicate to swap file 106 that data are transferred into, in the case of the tmp_write procedure, or out of; in the case of the tmp_read procedure, the single data buffer represented by the iovec structure as specified in step 810 (FIG. 8). By invocation of the VOP_READ( ) procedure or the VOP_WRITE( ) procedure, devtmp device driver 102 effects physical transfer of data to and/or from anonymous storage and therefore effects realization of temporary files in anonymous storage.

Representation of a Virtual Device

To realize temporary files in anonymous storage in the manner described above, devtmp device driver 102 (FIG. 3) represents a virtual device and data access of the virtual device is realized through data access in anonymous storage through swap file system 106 (FIG. 1). UNIX file system 104, VFS 108, and vnode layer 110 expect that devtmp device driver 102 is transferring data to and from a physical device. Therefore, devtmp device driver 102 includes data and computer instructions which collectively represent a state and behavior of a virtual device to thereby emulate a state and behavior of a physical device.

Devtmp device driver 102 (FIG. 3) includes a devtmp device structure 302 and procedures 304. Devtmp device structure 302 represents the state of the virtual device in which temporary files are stored and maintained. Devtmp device structure 302 includes information which operating system 210 FIG. 2) expects each device driver to provide regarding the particular device managed by the device driver. Devtmp device structure 302 (FIG. 3) is shown in greater detail in FIG. 4.

Devtmp device structure 302 includes a number of fields, each of which represents a characteristic of the virtual device represented by devtmp device structure 302. A field is a collection of data which collectively define an item of information. Devtmp device structure 302 includes (i) a device information pointer field 402, (ii) a size field 404, (iii) a blocksize field 406, (iv) a number of blocks field 408, (v) a minimum size field 410, and (vi) a swap file system field 412.

Device information pointer field 402 includes data which specifies the position, within a UNIX device tree, of a data structure which represents the virtual device represented by devtmp device structure 302. UNIX device trees are conventional and well-known.

Size field 404 includes data which specifies the amount of storage space available on the virtual device represented by devtmp device structure 302. Since the device represented by devtmp device structure 302 is a virtual device, the device can generally have any amount of storage available. However, since the data stored in the virtual device is actually stored somewhere, i.e., in anonymous storage, it is preferred that size field 404 represent the amount of anonymous storage available for data stored in the virtual device represented by devtmp device structure 302. In one embodiment, the amount of storage space available on the virtual device as represented in size field 404 is the total amount of unused anonymous storage available through swap file system 106 (FIG. 1) beyond a reserved amount of anonymous storage which operating system 210 (FIG. 2) requires for successful operation. To make such a calculation, devtmp device driver 102 (FIG. 1) requests and receives from swap file system 106 data representing the amount of unused anonymous storage available through swap file system 106. Some conventional swap file systems provide such functionality. Other conventional swap file systems require modification to provide such functionality. However, since swap file systems generally include information regarding the state and availability of all anonymous storage, calculating and providing data representing the total amount of unused anonymous storage available through such a swap file system is a relatively simple task.

Blocksize field 406 of devtmp device structure 302 includes data which represent the size of a block of data which is accessed in a single access of the virtual device represented by devtmp device structure 302. Number of blocks field 408 includes data which represent the total number of blocks of data in the virtual device.

Figure 4:
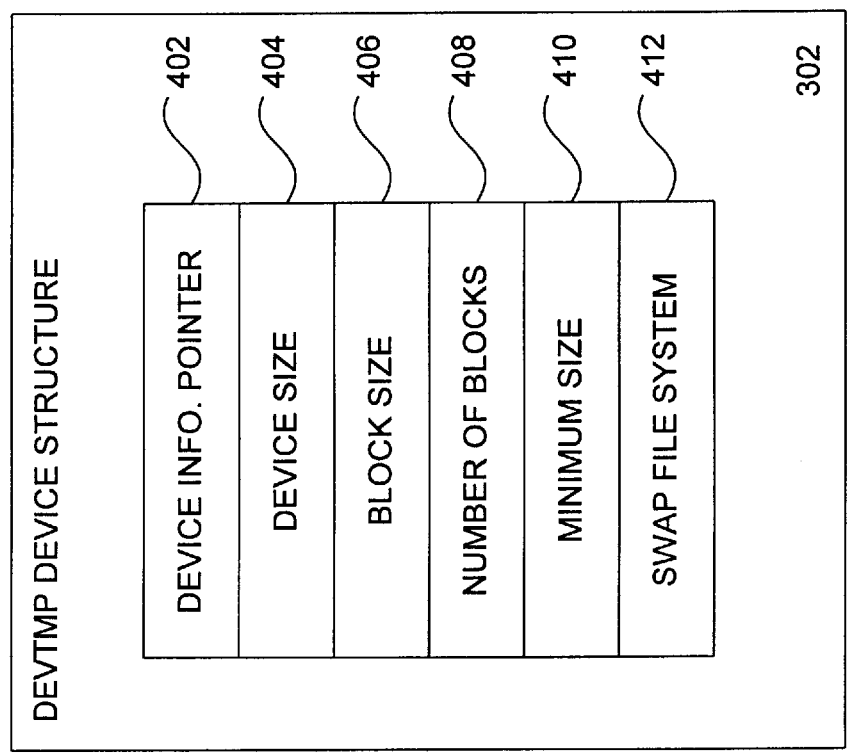
FIG. 4 is a block diagram of a devtmp device structure of the devtmp device driver of FIG. 3.

Minimum size field 410 includes data which represent the minimum size of newly allocated segment of a block or blocks in the virtual device. When devtmp device driver 102 (FIG. 3) allocates a segment of anonymous storage for a new map segment record in step 806 (FIG. 8) as described above, devtmp device driver 102 (FIG. 3) ensures that the anonymous storage segment is at least the size specified in minimum size field 410 (FIG. 4). Accordingly, devtmp device driver 102 avoids excessive interaction with swap file system 106 (FIG. 1) to create many, small anonymous storage segments in response to repeated accesses of a temporary file involving small amounts of data. Instead, devtmp device driver 102 (FIG. 3) creates fewer, larger anonymous storage segments and repeatedly finds such larger anonymous storage segments for each data access in step 802 FIG. 8) as described above. It is appreciated that an excessively large minimum anonymous storage segment size represented in minimum size field 410 FIG. 4) results in inefficient use of anonymous storage as large anonymous storage segments, only a small portion of which may be actually used, are allocated. Conversely, it is also appreciated that an unnecessarily small minimum anonymous storage segment size represented in minimum size field 410 results in poor performance as devtmp device driver 102 (FIG. 3) must request allocation of anonymous storage segments from swap file system 106 (FIG. 1) more frequently. Swap file system field 412 contains data which identifies swap file system 106 as the file system through which anonymous storage segments are allocated and accessed.

The block size and the number of blocks of the virtual device represented by devtmp device structure 302 (FIG. 3) are generally unrelated to any physical device and are only provided since operating system 210 (FIG. 2) typically requires such information in attaching devtmp device driver 102 by use of the known UNIX command, "attach." The particular data stored in each of these fields are selected so as to avoid any kind of special optimization provided by operating system 210 in accessing data within the virtual device represented by devtmp device structure 302 (FIG. 3). Such a selection is generally preferred since any optimization provided by operating system 210 (FIG. 2) is likely to be provided under the assumption that the device is a magnetic disk drive and is therefore likely to introduce inefficiency in access to data stored within the virtual device which is realized in anonymous storage as described above. In one embodiment, (i) block size field 406 contains data representing a block size of 4096 bytes; (ii) number of blocks field 408 contains data representing the amount of available storage space represented in size field 404 divided by the block size represented in block size field 406; and (iii) minimum size field 410 contains data representing a minimum anonymous storage segment size of 8192 bytes.

Procedures 304 (FIG. 3) of devtmp device driver 102 implement the interface and behavior expected by operating system 210 (FIG. 2). Procedures 304 (FIG. 3) include the tmp_read( ), tmp_write( ), tmp_strategy( ), and tmp_rw( ) procedures described above. However, for these procedures to operate in conjunction with UNIX file system 104 (FIG. 1) in the manner described above, devtmp device driver 102 must generally be mounted and attached within operating system 210 (FIG. 2). The attaching and mounting of device drivers are known and conventional. Attaching a device driver initializes the device driver and provides to UNIX file system 104 (FIG. 1) information required by UNIX file system 104 to allow computer processes executing within computer system 200 (FIG. 2) to store files in the device managed by the attached device driver. In attaching devtmp device driver 102 (FIG. 3), an alphanumeric identifier is associated with the virtual device managed by devtmp device driver 102. Accordingly, a computer process executing within computer system 200 (FIG. 2) can designate the virtual device as the device within which to store a particular file. Since the file is stored in the virtual device managed by devtmp device driver 102, the file is actually stored in anonymous storage and is a temporary file. Mounting a device driver such as devtmp device driver 102 associates within VFS 108 a name with the virtual device managed by devtmp device driver 102. In one embodiment, the name associated with the virtual device is "devtmp."

Thus, a computer process executing within computer system 200 creates a temporary file by invocation of the known, conventional open( ) procedure of UNIX file system 104 while indicating that the file is to be created within the device devtmp. VFS 108 and vnode layer 110 direct procedure invocations to procedures 304 (FIG. 3) of devtmp device driver 102 such that data access of the created file is implemented by devtmp device driver 102 in the manner described above.

Figure 6:
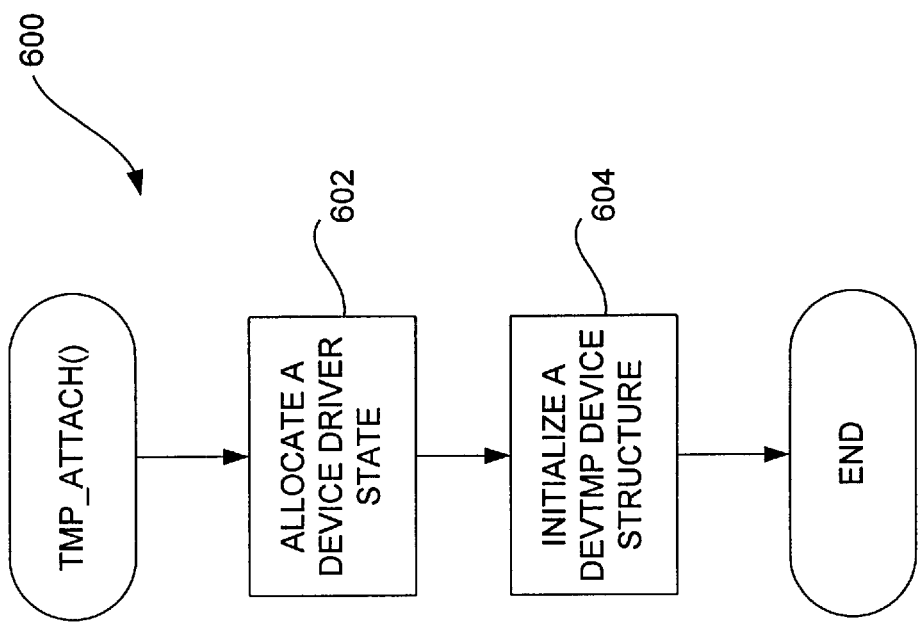
FIG. 6 is a logic flow diagram of an attach procedure implemented by the devtmp device driver of FIG. 3.

Procedures 304 (FIG. 3) include a tmp_attach( ) procedure which implements the standard attach( ) procedure and which initializes data structures within devtmp device driver 102. Processing according to the tmp_attach( ) procedure is illustrated by logic flow diagram 600 (FIG. 6) in which processing begins in step 602.

In step 602, devtmp device driver 102 (FIG. 1) allocates a device driver state using a Device-Driver Interface of operating system 210 (FIG. 2). An example of the Device-Driver Interface of operating system 210 (FIG. 2) is the well-known Device-Driver Interface described UNIX System Laboratories, *Device Driver Programming—UNIX SVR*4.2, (UNIX Press, Prentice-Hall, Englewood Cliffs, N.J.) (1992). The allocation of a device driver state using such a Device-Driver Interface is conventional. In step 604, devtmp device driver 102 initializes devtmp device structure 302 (FIG. 3). Step 604 is shown in greater detail as logic flow diagram 604 (FIG. 9) in which processing begins in step 902.

In step 902, devtmp device driver 102 (FIG. 3) initializes size field 402 (FIG. 4) of devtmp device structure 302 to include data representing the amount of storage space available on the virtual device represented by devtmp device structure 302. In step 904 (FIG. 9), devtmp device driver 102 (FIG. 3) initializes blocksize field 404 (FIG. 4) of devtmp device structure 302. In step 906 (FIG. 9), devtmp device driver 102 (FIG. 3) initializes number of blocks field 408 (FIG. 4) to include data representing the number of blocks of available storage space available on the virtual device. In step 908 (FIG. 9), devtmp device driver 102 (FIG. 3) initializes minimum size field 410 (FIG. 4) to include data representing a minimum anonymous storage segment size as described above. In one embodiment, devtmp device driver 102 (FIG. 3) initializes size field 404 (FIG. 4), blocksize field 406, number of blocks field 408, and minimum size field 410 to have the specific values described above with respect to FIG. 4.

Figure 9:
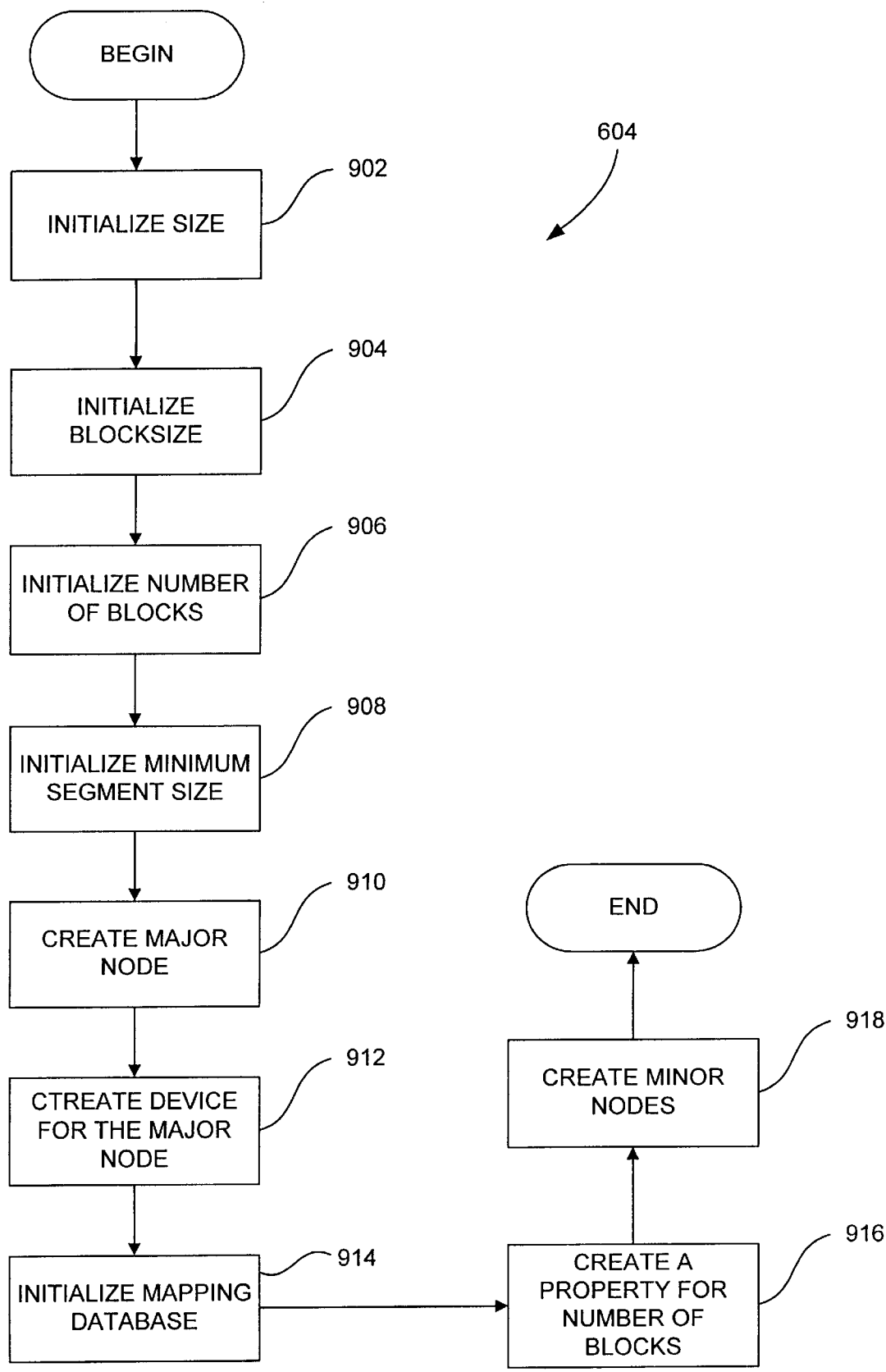
FIG. 9 is a logic flow diagram of a step of the logic flow diagram of FIG. 6.

In step 910 FIG. 9), devtmp device driver 102 (FIG. 1) creates a major node which has the name "devtmp." In other words, devtmp device driver 102 (FIG. 1) creates a type of device which corresponds to a particular major device number within operating system 210 (FIG. 2). In step 912 (FIG. 9), devtmp device driver 102 (FIG. 1) creates a device for the major node created in step 910 (FIG. 9). Specifically, devtmp device driver 102 (FIG. 1) creates within operating system 210 (FIG. 2) data structures to represent a specific device of the type created in step 910 (FIG. 9).

In step 914 (FIG. 9), devtmp device driver 102 (FIG. 3) initializes mapping database 306. Upon initialization in step 914 (FIG. 9), mapping database 306 (FIG. 3) includes no map segment records.

In step 916 (FIG. 9), devtmp device driver 102 (FIG. 1) creates a Device-Driver Interface property representing the number of blocks of storage space provided by the virtual device managed by devtmp device driver 102. The property is created in step 916 (FIG. 9) because VFS 108 FIG. 1), in one embodiment, requires that all block devices maintain such a property.

In step 918 (FIG. 9), devtmp device driver 102 (FIG. 1) creates minor nodes within VFS 108 for the virtual device to ensure that a device record within VFS 108 representing the virtual device is properly initialized. Devtmp device driver 102 creates both (i) a minor node corresponding to a character file within the virtual device and (ii) a minor node corresponding to a block file within the virtual device and tests to see that both minor nodes are successfully created. Once devtmp device driver 102 has verified that minor nodes for both types of files can be successfully created, processing according to logic flow diagram 604 (FIG. 9), and therefore step 604 (FIG. 6), completes. Thus, in step 604, devtmp device driver 102 (FIG. 3) initializes devtmp device structure 302 and a device record of VFS 108.

After step 604, processing according to logic flow diagram 600, and therefore according to the tmp_attach( ) procedure of procedures 304, completes.

Delayed Write Mode and Callbacks

In one embodiment, operating system 210 (FIG. 2) allows a device driver to be mounted using a delayed-write mode in which (i) metadata is not written to secondary storage, i.e., remains in primary storage, and (ii) substantive data is not written to secondary storage unless primary storage is needed for other tasks or is otherwise unavailable. In this embodiment, devtmp device driver 102 is mounted in operating system 210 using the delayed-write mode. Accordingly, metadata is not written to secondary storage at all and substantive data is stored in secondary storage only when primary storage is needed either to store additional substantive data on the virtual device represented by devtmp device driver 102 or to store data on behalf of another computer process of computer system 200. When substantive data is written to secondary storage, the substantive data is written to the virtual device managed by devtmp device driver 102 and ultimately to anonymous storage managed by swap file system 106 in the manner described above.

UNIX file system 104 includes a number of callbacks which are known and which invoke procedures within a device driver such as devtmp device driver 102 in response to well-known occurrences. One such occurrence is the release by UNIX file system 104 of a block of data stored on the device managed and represented by the device driver. When UNIX file system 104 issues to devtmp device driver 102 a callback representing release of one or more blocks of data on the virtual device represented by devtmp device driver 102, devtmp device driver 102 receives the callback and frees anonymous storage which corresponds to the released blocks such that the corresponding anonymous storage can be subsequently used. Freed anonymous storage can be used, for example, to store data representing other blocks of the virtual device represented by devtmp device driver 102 or can be used to represent virtual memory of computer processes of computer system 200.

In conventional device drivers, callbacks representing release of one or more blocks of data of a physical device are not received or are not recognized since device drivers managing physical secondary storage devices do not care whether a particular block is free. Instead, such device drivers simply effect whatever data access is requested directly or indirectly by any of the components of FIG. 1.

However, since devtmp device driver 102 shares anonymous storage with other components of operating system 210 (FIG. 2), devtmp device driver 102 releases anonymous storage when such anonymous storage is no longer needed. UNIX file system 104 informs devtmp device driver 102 when anonymous storage is no longer needed by operation of the callback mechanism which informs devtmp device driver 102 that one or more blocks of the virtual device are freed.

Conclusion

Thus, by attaching and mounting devtmp device driver 102, access by computer processes executing within computer system 200 (FIG. 2) to data stored on the device devtmp invokes procedures 304 (FIG. 3) of devtmp device driver 102. Data stored on the virtual device managed by devtmp device driver 102 are actually stored in anonymous storage of computer system 200 (FIG. 2) through swap file system 106 as described above. Any modifications or enhancements to UNIX file system 104 are therefore automatically implemented for temporary files since temporary files are accessed and maintained through UNIX file system 104. In addition, since temporary files are not accessed and maintained through a separate file system other than UNIX file system 104, devtmp device driver 102 has a degree of complexity more comparable to device drivers 112A–B rather than a degree of complexity comparable to UNIX file system 104. Since device drivers 112A–B are typically much less complex than UNIX file system 104, devtmp device driver 102 can generally be implemented and maintained much more easily than prior art temporary file systems while providing generally at least the same functionality and performance of prior art temporary file systems.

The above description is illustrative only and is not limiting. The present invention is therefore defined solely and completely by the appended claims together with their full scope of equivalents.

What is claimed is:

1. In a computer system having an operating system (OS) which is structured to allow multiple different file system types to coexist within the operating system, the computer system including at least one volatile memory storage device and at least one non-volatile memory storage device, said operating system including a file system (FS) for cataloguing files, said files including a data portion and a metadata portion, a method for implementing a temporary file within said file system, the method comprising:

(a) providing a file manager within the file system for managing persistent data files and non-persistent data files within said operating system;

(b) mounting and attaching within the operating system a device driver for representing a virtual memory device used for implementing at least one non-persistent data file within said computer system, said virtual memory device including an anonymous storage system, said anonymous storage system utilizing a swap file system for allocating anonymous storage space in said anonymous storage system;

(c) using said file manager to invoke procedures within said device driver for accessing desired information within said virtual memory device relating to said at least one non-persistent data file; and (d) using said device driver to effect access of said desired information within said anonymous storage system.

2. The method of claim 1 wherein said computer system includes a second device driver for managing a secondary storage device, said method further including the step of configuring each device driver to implement an interface and an operating behavior which are substantially similar to each other device driver within said computer system.

3. The method of claim 1 including the step of storing the data portion and metadata portion of a non-persistent file in said anonymous storage system.

4. The method of claim 1 wherein said operating system is a UNIX-based operating system.

5. The method of claim 1 wherein said mounting step (b) further includes the step of mounting said device driver such that files are accessed using a delayed-write mode.

6. The method of claim 1 further including the step of using said device driver to manage information stored in said anonymous storage system by invoking procedures defined within said swap file system.

7. In a computer system having an operating system (OS) which is structured to allow multiple different file system types to coexist within the operating systems the computer system including at least one volatile memory storage device and at least one non-volatile memory storage device, said operating system including a storage media file system (FS) for cataloging files, a method for implementing a non-persistent data file within said file systems the method comprising:

(a) providing a file manager within the file system for managing persistent data files and non-persistent data files;

(b) mounting and attaching within the operating system a device driver representing a virtual memory device used for implementing non-persistent data files within said computer system, said virtual memory device including an anonymous storage system said anonymous storage system utilizing a swap file system for allocating anonymous storage space in said anonymous storage system;

(c) creating a non-persistent data file by invocation of a procedure of the storage media file system, while indicating that said non-persistent data file is to be created within the virtual memory device associated with said device driver; and (d) utilizing said device driver to allocate anonymous storage space within said anonymous storage system for storage of information relating to said non-persistent data file.

8. The method of claim 7 further including the step of releasing said allocated anonymous storage space in response to the storage media file system invoking a callback procedure in said device driver.

9. The method of claim 7 wherein said computer system includes a second device driver for managing a secondary storage device, said method further including the step of configuring each device driver to implement an interface and an operating behavior which are substantially similar to each other device driver within said computer system.

10. The method of claim 7 further including the step of storing data and metadata related to said non-persistent data file in said anonymous storage space.

11. The method of claim 7 wherein said operating system is a UNIX-based operating system.

12. The method of claim 7 wherein said mounting step (a) further includes the step of mounting said device driver such that files are accessed using a delayed-write mode.

13. The method of claim 7 further including the step of using said device driver to manage information stored in said anonymous storage system by invoking procedures defined within said swap file system.

14. A computer program product for use in a computer system having an operating system (OS) which is structured to allow multiple different file system types to coexist within the operating system, the computer system including at least one volatile memory storage device and at least one non-volatile memory storage device, said operating system including a storage media file system (FS) for cataloging files, the computer program product comprising a computer usable medium having computable readable code embodied therein for implementing a temporary file system in the computer system, the computer readable code comprising:

computer code for providing a file manager within the file system for managing persistent data files and non-persistent data files within said operating system;

computer code for mounting and attaching within the operating system a device driver for representing a virtual memory device used for implementing at least one non-persistent data file within the computer system;

computer code for implementing an anonymous storage system for use by said virtual memory device, said anonymous storage system utilizing a swap file system for allocating anonymous storage space in said anonymous storage system;

computer code for using the file manager to invoke procedures within said device driver for accessing desired information within said virtual memory device relating to said at least one non-persistent data file;

computer code for using said device driver to effect access of said desired information within said anonymous storage system; and a computer readable medium that stores the computer codes.

15. The computer program product of claim 14 wherein the computer readable medium is a data signal embodied in a carrier wave.

16. The computer program product of claim 14, wherein said computer system includes a second device driver for managing a secondary storage device, said computer program product further including computer code for configuring each device driver to implement an interface and an operating behavior which are substantially similar to each other device driver within said computer system.

17. The computer program product of claim 14, including computer code for storing the data portion and metadata portion of a non-persistent file in said anonymous storage system.

18. The computer program product of claim 14 wherein said operating system is a UNIX-based operating system.

19. The computer program product of claim 14 further including computer code for mounting said device driver such that files are accessed using a delayed-write mode.

20. The computer program product of claim 14 further comprising:

computer code for using said device driver to manage information stored in said anonymous storage system by invoking procedures defined within said swap file system.

21. A computer program product for use in a computer system having an operating system (OS) which is structured to allow multiple different file system types to coexist within the operating system, the computer system including at least one volatile memory storage device and at least one non-volatile memory storage device, said operating system including a storage media file system (FS) for cataloging files, the computer program product comprising a computer usable medium having computable readable code embodied therein for implementing a temporary file system in the computer system, the computer readable code comprising:

computer code for providing a file manager within the file system for managing persistent data files and non-persistent data files within said operating system;

computer code for mounting and attaching within the operating system a device driver representing a virtual memory device used for implementing non-persistent data files within said computer system;

computer code for implementing an anonymous storage system for use by said virtual storage devices said anonymous storage system utilizing a swap file system for allocating anonymous storage space in said anonymous storage system;

computer code for creating a non-persistent data file by invocation of a procedure of the storage media file system, while indicating that said non-persistent data file is to be created within the virtual memory device associated with said device driver;

computer code for utilizing said device driver to allocate anonymous storage space within said anonymous storage system for storage of information relating to said non-persistent data file; and a computer readable medium that stores the computer codes.

22. The computer program product of claim 21 wherein the computer readable medium is a data signal embodied in a carrier wave.

23. The computer program product of claim 21 further including computer code for releasing said allocated anonymous storage space in response to the storage media file system invoking a callback procedure in said device driver.

24. The computer program product of claim 21, wherein said computer system includes a second device driver for managing a secondary storage device, said computer program product further including computer code for configuring each device driver to implement an interface and an operating behavior which are substantially similar to each other device driver within said computer system.

25. The computer program product of claim 21 further including computer code for storing data and metadata related to said non-persistent data file in said anonymous storage space.

26. The computer program product of claim 21 wherein said operating system is a UNIX-based operating system.

27. The computer program product of claim 21 further including computer code for mounting said device driver such that files are accessed using a delayed-write mode.

28. A system for implementing temporary files in a computer system having an operating system (OS) which is structured to allow multiple different file system types to coexist within the operating system, the computer system including at least one volatile memory storage device and at least one non-volatile memory storage device, the operating system including a file system (FS) for cataloguing files, the system comprising:

a file manager configured within the file system for managing persistent data files and non-persistent data files within said operating system; and a device driver mounted and attached within the operating system for representing a virtual memory device used for implementing at least one non-persistent data file within said computer system;

said virtual memory device including an anonymous storage system the anonymous storage system utilizing a swap file system for allocating anonymous storage space in said anonymous storage system;

said device driver being responsive to instructions from the file manager for invoking procedures to access desired information within said virtual memory device relating to said at least one non-persistent data file;

said device driver including means for effecting access of said desired information within said anonymous storage system.

29. The system of claim 28 wherein said computer system includes a second device driver for managing a secondary storage device, and wherein each device driver is configured to implement an interface and an operating behavior which are substantially similar to each other device driver within said computer system.

30. The system of claim 28 wherein a data portion and a metadata portion of said at least one a non-persistent file are stored in said anonymous storage system.

31. The system of claim 28 wherein said operating system is a UNIX-based operating system.

32. The system of claim 28 wherein said device driver is mounted within said operating system such that files are accessed using a delayed-write mode.

33. The system of claim 28 wherein said device driver includes means for managing information stored in said anonymous storage system by invoking procedures defined within said swap file system.

34. An apparatus for implementing temporary files in a computer system having an operating system (OS) which is structured to allow multiple different file system types to coexist within the operating system, the computer system including at least one volatile memory storage device and at least one non-volatile memory storage device, said operating system including a storage media file system (FS) for cataloging files, the apparatus comprising:

a file manager configured within the storage media file system for managing persistent data files and non-persistent data files within said operating system; and a device driver mounted and attached within the operating system for representing a virtual memory device used for implementing at least one non-persistent data file within said computer system;

said virtual memory device including an anonymous storage system, the anonymous storage system utilizing a swan file system for allocating anonymous storage space in said anonymous storage system;

said device driver being responsive to instructions from the storage media file system for invoking a procedure for creating a non-persistent data file within the virtual memory device.

35. The apparatus of claim 34 wherein said device driver includes means for releasing said allocated anonymous storage space in response to the storage media file system invoking a callback procedure.

36. The system of claim 34 wherein said computer system includes a second device driver for managing a secondary storage device, and wherein each device driver is configured to implement an interface and an operating behavior which are substantially similar to each other device driver within said computer systems.

37. The system of claim 34 wherein said device driver includes means for allocating anonymous storage space within said anonymous storage system for storage of data and metadata relating to said non-persistent data file.

38. The apparatus of claim 34 wherein said operating system is a UNIX-based operating system.

39. The apparatus of claim 34 wherein said device driver is mounted within said operating system such that files are accessed using a delayed-write mode.

40. The apparatus of claim 34 wherein said device driver includes means for managing information stored in said anonymous storage system by invoking procedures defined within said swap file system.

* * * * *